(No Model.)

W. W. GRISCOM.
SECONDARY BATTERY.

No. 481,560. Patented Aug. 30, 1892.

Witnesses
Edward Thorpe.
W. L. Place.

Inventor
William W. Griscom,
By his Attorney

UNITED STATES PATENT OFFICE.

WILLIAM W. GRISCOM, OF HAVERFORD COLLEGE, ASSIGNOR TO THE ACCUMULATOR COMPANY, OF PHILADELPHIA, PENNSYLVANIA.

SECONDARY BATTERY.

SPECIFICATION forming part of Letters Patent No. 481,560, dated August 30, 1892.

Application filed November 16, 1891. Serial No. 412,023. (No model.)

*To all whom it may concern:*

Be it known that I, WILLIAM W. GRISCOM, a citizen of the United States, and a resident of Haverford College, in the county of Philadelphia and State of Pennsylvania, have invented certain new and useful Improvements in Secondary Batteries, of which the following is a specification.

My invention is an improvement in secondary batteries.

The invention relates to the plate or support to which the finely-divided absorptive material or active material is applied, and more particularly to the form of the perforations in such plate. These perforations are four-sided and extend through the plate. Two opposite sides are concave and the other two opposite sides have a suitably-formed holding or contact surface for the active material. As I have shown and described my improvement these other two opposite sides are plane surfaces with a rib or projection extending inwardly. I prefer to cast this perforated plate from molten lead and to use a two-part chill or mold.

Plates formed with four concave-sided perforations are well known; but they cannot be cast by any means known to me, nor can they be otherwise economically produced; but plates having perforations, two opposite sides only of which are concave, the other two sides being otherwise shaped, are readily and cheaply manufactured, and in practical use they are equal or superior to the plates having four-sided concave perforations.

Figure 1:
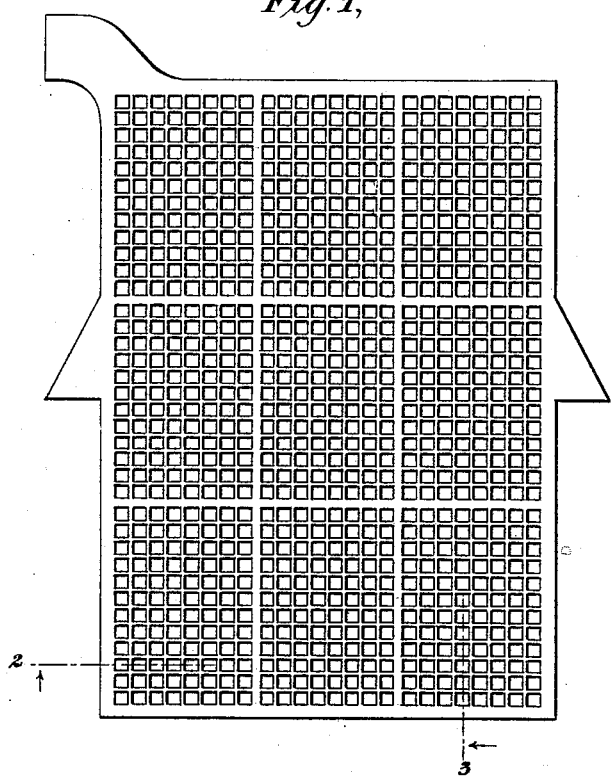
Figure 2:
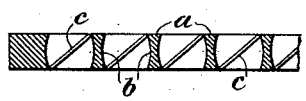
Figure 3:

Figure 1 is a plan view of a perforated plate containing my improvement. Fig. 2 is a cross-section showing the peculiar form of the perforations. Fig. 3 is a cross-section at right angles to Fig. 2.

*a* is the bar, division, or wall between adjacent perforations. The interior opposite sides *b b* of the two walls of this perforation are concave. The other two opposite walls, as shown in Fig. 3, are substantially plane surfaces, except that there is a rib or projection extending inwardly from one corner of the perforation to the diagonally-opposite corner.

I prefer to apply the finely-divided absorptive material in the form of an oxide of lead mixed with dilute sulphuric acid to the consistency of a stiff paste. I apply this with a hand-tool—such as a flat chisel or spatula—to the interior of the perforations, excluding the paste from the surface of the plate. I have found by the use of this form of plate that the expansion and contraction due to the operation of charge and discharge in secondary batteries are less liable to displace and disintegrate such absorptive material, and the result is a battery of greater durability, and I am able to use absorptive material much coarser in its nature—that is, absorptive material which is not so finely divided, as has hitherto been thought necessary for the production of a successful secondary battery. A series of these plates are electrically coupled together and placed in alternation with a second and similar series of plates, both series being immersed in dilute sulphuric acid in a suitable inclosing cell, as is well known in the art of secondary-battery construction.

What I claim, and desire to secure by Letters Patent, is—

1. In a secondary battery, plates or supports having a series of holes or perforations extending therethrough, each of said perforations having two opposite walls only concave, substantially as described.

2. In a secondary battery, plates or supports for the active material, having a series of holes or perforations extending therethrough, each of said perforations having its opposite walls only concave, the two complementary opposite walls having a suitable holding-surface, substantially as described.

3. A plate for use in a secondary battery, having a series of holes or perforations extending therethrough, said perforations having two opposite walls concave and two opposite walls substantially plane surfaces, with an inwardly-projecting rib, substantially as described.

4. A plate for use in a secondary battery, composed of lead and having a series of substantially equidistant uniformly-arranged perforations, said perforations having four sides or walls, two opposite walls being concave and two opposite walls being substantially plane surfaces, with a diagonal inwardly-projecting rib or projection, substantially as described.

5. A plate for use in a secondary battery, having a series of holes or perforations extending therethrough, said perforations having two opposite walls concave and two opposite walls substantially plane surfaces, with an inwardly-projecting rib or extension, and finely-divided absorptive material packed in said perforations, substantially as and for the purpose set forth.

WILLIAM W. GRISCOM.

Witnesses:
L. T. POND,
C. K. AUSTIN.